(12) United States Patent
Koumvakalis et al.

(10) Patent No.: US 9,203,086 B2
(45) Date of Patent: Dec. 1, 2015

(54) THERMALLY MANAGED BATTERY ASSEMBLY

(71) Applicant: The Boeing Company, Chicago, IL (US)

(72) Inventors: Nicholas Koumvakalis, Thousand Oaks, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 13/902,207

(22) Filed: May 24, 2013

(65) Prior Publication Data

US 2014/0349162 A1    Nov. 27, 2014

(51) Int. Cl.
| | |
|---|---|
| *H01M 4/485* | (2010.01) |
| *H01M 4/04* | (2006.01) |
| *H01M 10/0525* | (2010.01) |
| *H01M 10/60* | (2014.01) |
| *H01M 10/654* | (2014.01) |
| *H01M 10/6554* | (2014.01) |
| *H01M 10/617* | (2014.01) |

(52) U.S. Cl.
CPC ............... *H01M 4/485* (2013.01); *H01M 4/04* (2013.01); *H01M 10/0525* (2013.01); *H01M 10/60* (2015.04); *H01M 10/617* (2015.04); *H01M 10/654* (2015.04); *H01M 10/6554* (2015.04); *Y02E 60/122* (2013.01); *Y10T 29/49108* (2015.01)

(58) Field of Classification Search
CPC ................................ H01M 4/485; H01M 4/04
USPC ............................ 429/223, 182.1, 224, 231.3
See application file for complete search history.

(56) References Cited

U.S. PATENT DOCUMENTS

| | | | |
|---|---|---|---|
| 8,094,023 B1 | 1/2012 | El-Kady et al. | |
| 2002/0136944 A1 | 9/2002 | Nemoto et al. | |
| 2011/0171529 A1* | 7/2011 | Kono et al. | 429/223 |
| 2013/0183566 A1* | 7/2013 | Wayne et al. | 429/120 |

OTHER PUBLICATIONS

Extended European Search Report, EP 14 16 2037 (2014).
Maldovan, "Narrow Low-frequency Spectrum and Heat Management by Thermocrystals," *Physical Review Letters*, vol. 110, No. 2 (2013).
Julien, "Local Structure and Electrochemistry of Lithium Cobalt Oxides and Their Doped Compounds," *Solid State Ionics*, vol. 157 (2003).
Kalaiselvi et al., "Iron Doped Lithium Cobalt Oxides As Lithium Intercalating Cathode Materials," *Ionics*, vol. 7 (2001).
Maldovan, "Narrow Low-frequency Spectrum and Heat Management by Thermocrystals," *Physical Review Letters*, 110, 025902 (2013).
Zhang et al., "Focusing Ultrasound with an Acoustic Metameterial Network," *Physical Review Letters*, 102, 194301 (2009).
John, "Strong Localization of Photons in Certain Disordered Dielectric Superlattices," *Physical Review Letters*, vol. 58, No. 23 (1987).
Guenneau et al., "Acoustic Metamaterials for Sound Focusing and Confinement," *New Journal of Physics*, vol. 9 (2009).

* cited by examiner

*Primary Examiner* — Cynthia H Kelly
*Assistant Examiner* — Monique Wills
(74) *Attorney, Agent, or Firm* — Walters & Wasylyna LLC

(57) ABSTRACT

A thermally managed Li-ion battery assembly including an anode and a cathode, wherein at least one of the anode and the cathode includes a thermocrystal metamaterial structure.

19 Claims, 3 Drawing Sheets

THERMALLY MANAGED BATTERY ASSEMBLY

FIELD

This application relates to batteries, such as rechargeable metal (e.g., lithium) ion batteries, and, more particularly, to thermal management of batteries and, even more particularly, to thermal management of batteries based on directional heat control.

BACKGROUND

Rechargeable batteries are used in a variety of applications, such as in aircraft and in electronic devices (e.g., computers and mobile telephones). While various types of rechargeable batteries are available in the marketplace, lithium-ion batteries, such as lithium cobalt oxide ($LiCoO_2$) batteries, are commonly used due to their relatively high energy density and lack of battery memory after a partial charge.

Lithium-ion batteries are known to generate heat, both under load and during charging. Therefore, when a battery application requires the high energy density provided by lithium-ion batteries, a thermal management system is commonly employed. One example of thermal management of Li-ion $CoO_2$ batteries is to physically separate the various cells. Another example thermal management system monitors the temperature of each cell in a lithium-ion battery and shuts down cells that are experiencing a temperature that exceeds a predetermined threshold value.

Despite advances already made, those skilled in the art continue with research and development efforts in the field of thermal management of batteries.

SUMMARY

In one embodiment, the disclosed thermally managed battery assembly may include an anode and a cathode, wherein at least one of the anode and the cathode includes a thermocrystal metamaterial structure.

In another embodiment, the disclosed thermally managed battery assembly may include an anode, a cathode and an electrolyte, wherein the cathode includes a thermocrystal metamaterial structure.

In another embodiment, the disclosed thermally managed battery assembly may include an electrolyte, an anode in electrical contact with the electrolyte, and a cathode in electrical contact with the electrolyte, wherein the cathode includes a thermocrystal metamaterial structure that includes impurities embedded within the crystal lattice.

In another embodiment, the disclosed thermally managed battery assembly may include an electrolyte, an anode in electrical contact with the electrolyte, and a cathode in electrical contact with the electrolyte, wherein the cathode includes a thermocrystal metamaterial structure that includes a layered metal oxide with metal ions embedded between the layers of metal oxide and impurities within the layers of metal oxide.

In yet another embodiment, also disclosed is a thermal management method that includes the steps of (1) forming an electrode having a thermocrystal metamaterial structure; (2) incorporating the electrode into a battery assembly; and (3) thermally coupling a heat sink to the electrode such that the thermocrystal metamaterial structure directionally aligns heat waves with the heat sink.

Other embodiments of the disclosed thermally managed battery assembly and method will become apparent from the following detailed description, the accompanying drawings and the appended claims.

DETAILED DESCRIPTION

Figure 1:
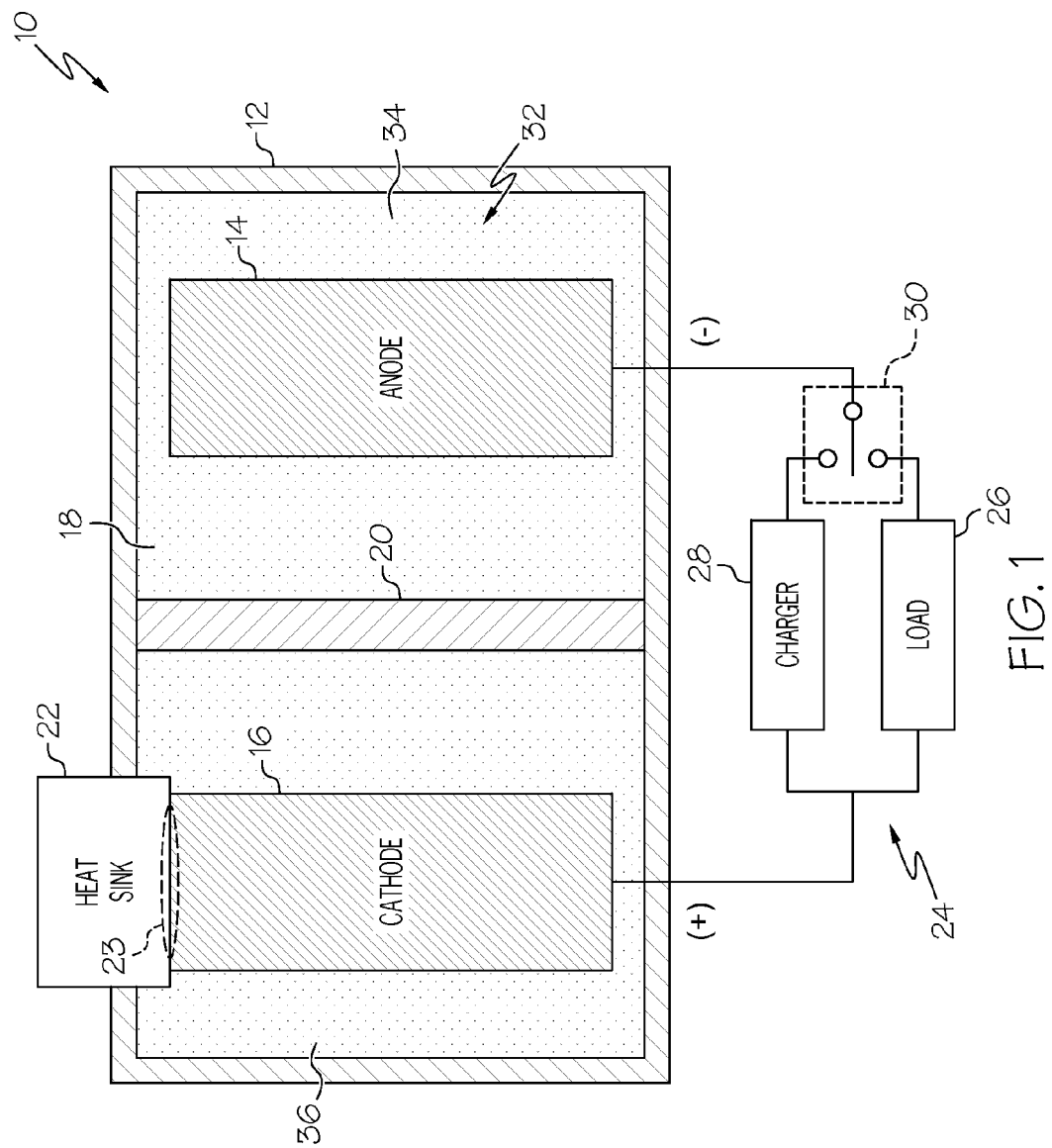
FIG. 1 is a schematic block diagram of one embodiment of the disclosed thermally managed battery assembly.

Referring to FIG. 1, one embodiment of the disclosed thermally managed battery assembly, generally designated 10, may include a battery housing 12, an anode 14, a cathode 16, an electrolyte 18, a separator 20 and a heat sink 22. The anode 14 and the cathode 16 of the thermally managed battery assembly 10 may be part of an electric circuit 24, which may include a load 26, a charger 28 and a switch 30. The switch 30 may be toggled between at least a first position, wherein the charger 28 charges the thermally managed battery assembly 10, and a second position, wherein the thermally managed battery assembly 10 powers the load 26.

The battery housing 12 may define an internal chamber 32 in which the anode 14, the cathode 16 and the electrolyte 18 may be received and housed. The battery housing 12 may be a water-tight and/or air-tight housing configured to isolate the anode 14, the cathode 16 and the electrolyte 18 from the ambient surroundings. As one example, the battery housing 12 may be a rigid plastic, metal or composite housing. As another example, the battery housing may be a pliable plastic housing.

The electrolyte 18 may be received in, and may partially fill or substantially entirely fill, the internal chamber 32 of the battery housing 12. The electrolyte 18 may be a liquid, a solid or a mixture of liquid and solid (e.g., a gel). Depending on the battery chemistry being employed, such as in the context of lithium-based battery chemistry, the electrolyte may be substantially free of water (e.g., non-aqueous) to avoid adverse chemical reactions.

Those skilled in the art will appreciate that various electrolyte compositions may be used without departing from the scope of the present disclosure. As one general, non-limiting example, the electrolyte 18 may be a non-aqueous electrolyte that includes a lithium salt in an organic solvent. As one specific, non-limiting example, the electrolyte 18 may be a non-aqueous electrolyte that includes lithium hexafluorophosphate ($LiPF_6$) in anhydrous ethylene carbonate (1,3-dioxolan-2-one).

An electrolyte is any compound that ionizes when dissolved in a suitable solvents (e.g., water). This includes most soluble salts, acids, and bases. In some cases, gases, such as hydrogen chloride, under conditions of high temperature or low pressure can also function as electrolytes. Electrolyte solutions can also result from the dissolution of some biological and synthetic polymers termed polyelectrolytes, which contain charged functional groups. When electrodes are positioned in an electrolyte and a voltage is applied, the electrolyte will conduct electricity, since they are ionized in solution. Lone electrons cannot pass through the electrolyte. Instead, a chemical reaction occurs at the cathode consuming electrons from the anode. Another reaction occurs at the anode, producing electrons that are eventually transferred to the cathode. As a result, a negative charge cloud develops in the electrolyte around the cathode and a positive charge develops around the anode. The ions in the electrolyte neutralize these charges, enabling the electrons to keep flowing and the reactions to continue. In batteries, two materials with different electron affinities are used as electrodes; electrons flow from one electrode to the other outside of the battery, while inside the battery the circuit is closed by the electrolyte's ions. Here the electrode reactions convert chemical energy to electrical energy.

The separator 20 may be received in the internal chamber 32 of the battery housing 12 to divide the internal chamber 32 into an anode chamber 34 and a cathode chamber 36. The separator 20 may fluidly and electrically isolate the anode chamber 34 (and thus the anode 14) from the cathode chamber 36 (and thus the cathode 16), while permitting ions to pass between the anode chamber 34 and the cathode chamber 36.

The separator 20 may be a permeable membrane, such as a permeable polymeric membrane. Various commercially-available permeable membranes may be suitable for use as the separation 20 of the disclosed thermally managed battery assembly 10. One specific, non-limiting example of a permeable membrane suitable for use as the separation 20 is a membrane formed from Hi-Sil™ precipitated silica, which is available from PPG Industries of Pittsburgh, Pa.

The anode 14 may be received in the anode chamber 34 and may be in electrical contact with (e.g., submerged in) the electrolyte 18. The anode 14 may function as the negative electrode of the thermally managed battery assembly 10. Therefore, the anode 14 may be electrically conductive.

Those skilled in the art will appreciate that various anode compositions may be employed. Selection of the composition of the anode 14 may be dictated by, among other things, the composition of the electrolyte 18 (e.g., the anode 14 may be formed from a material that does not degrade when exposed to the electrolyte 18). As one general, non-limiting example, the anode 14 may be formed from a conductive carbonaceous material. As one specific, non-limiting example, the anode 14 may be formed from graphite.

The cathode 16 may be received in the cathode chamber 36 and may be in electrical contact with (e.g., submerged in) the electrolyte 18. The cathode 16 may function as the positive electrode of the thermally managed battery assembly 10. Therefore, the cathode 16 may be electrically conductive.

High frequency lattice vibrations within the cathode 16 may generate heat. With prior art cathodes, this heat is dissipated in all directions, thereby making it difficult to effectively remove the heat. It is believed that thermal management of the disclosed thermally managed battery assembly 10 may be enhanced by constructing the cathode 16 as a thermocrystal metamaterial structure. The thermocrystal metamaterial structure of the cathode 16 may freely conduct electricity. However, the thermocrystal metamaterial structure of the cathode 16 may shift the lattice vibration frequencies that generate heat (which may be in the terahertz range) to a lower frequency range (e.g., about 100 to about 300 gigahertz) and may directionally align the vibrations. Therefore, without being limited to any particular theory, the thermocrystal metamaterial structure of the cathode 16 may focus the heat waves (or at least a significant frequency portion of the heat waves) onto the heat sink 22 rather than emit, or allow multi-directional propagation of, heat in all directions.

The thermocrystal metamaterial structure of the cathode 16 may be constructed using various cathode materials known in the art, such as traditional crystalline cathode materials (e.g., lithium cobalt oxide). The specific composition of the cathode 16 may be dictated by, among other things, battery chemistry and electrolyte compatibility, as well as the ability to use the material of interest to form thermocrystal metamaterials suitable for use as a cathode in a battery.

In one particular implementation, the cathode 16 may include a layered metal oxide having metal ions embedded between the layers of the metal oxide crystal lattice, as is known in the art. However, impurities may be introduced to the metal oxide crystal lattice to distort energy bands, thereby rendering the cathode 16 a thermocrystal metamaterial structure. As used herein, an "impurity" in a crystal lattice includes any interstitial defect in the crystal lattice, as well as engineered compositional modifications to the crystal lattice, such as the replacement of some elements in the crystal lattice with other elements to yield a metamaterial.

Figure 2:
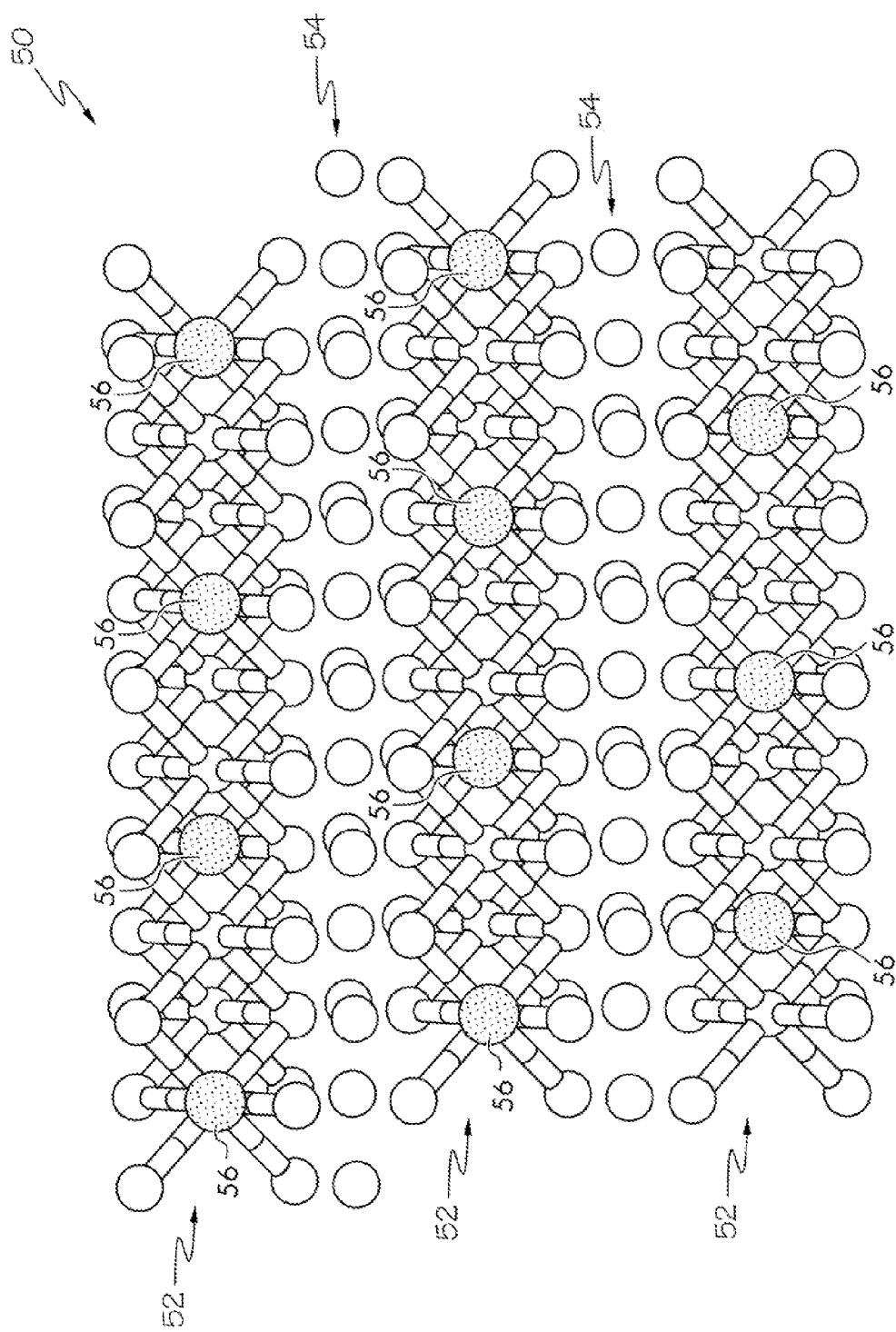
FIG. 2 is a schematic representation of the thermocrystal structure of the cathode of the thermally managed battery assembly of FIG. 1.

As one specific, non-limiting example, the cathode 16 may include a lithium cobalt oxide-based thermocrystal metamaterial structure. As shown in FIG. 2, the lithium cobalt oxide-based thermocrystal metamaterial structure, generally designated 50, may include layers of cobalt oxide ($CoO_2$) 52 with lithium ions ($Li^+$) 54 embedded between the layers of cobalt oxide 52. Impurities 56 may be introduced to the layers of cobalt oxide 52 to form the thermocrystal metamaterial structure 50 such that the thermocrystal metamaterial structure 50 of the cathode 16 (FIG. 1) may directionally guide heat waves to the heat sink 22 (FIG. 1).

Still referring to FIG. 2, the impurities 56 may be introduced to the cobalt oxide crystal lattice 52 by replacing some of the cobalt (Co) within the lattice 52 with a similar element. For example, iron (Fe) and/or nickel (Ni), which are metals located adjacent to cobalt on the periodic table, may replace some of the cobalt within the crystal lattice 52 such that the iron and nickel act as impurities 56.

Alternatively or in addition to selective element replacement, impurities 56 may be introduced to the cobalt oxide crystal lattice 52 by interstitially embedding materials into the crystal lattice 52. For example, nanoparticles, such as iron nanoparticles, may be incorporated into the cobalt oxide crystal lattice 52 as interstitial defects.

Referring back to FIG. 1, the heat sink 22 may be thermally coupled to the cathode 16. As one non-limiting example, the heat sink 22 may be position proximate (e.g., in abutting engagement with) the cathode 16. As another non-limiting example, a thermally conductive adhesive may thermally couple the heat sink 22 to the cathode 16.

The specific location of the heat sink 22 relative to the cathode 16 may be dictated by the configuration of the cathode 16. Specifically, the heat sink 22 may be located proximate the target area 23 upon which the thermocrystal metamaterial structure of the cathode 16 may focus heat.

The heat sink 22 may be any apparatus or system capable of removing heat from the thermally managed battery assembly 10. Therefore, the heat sink 22 may transfer away from the thermally managed battery assembly 10 thermal energy (heat) generated within the battery housing 12. The heat sink 22 may be active or passive. As one non-limiting example, the heat sink 22 may be a mass of thermally conductive material (e.g., copper), which may or may not be finned. As another non-limiting example, the heat sink 22 may include a flowing cooling fluid. The cooling fluid may be a liquid (e.g., water or glycol) or a gas (e.g., ambient air).

While the present disclosure focuses on constructing the cathode 16 of the thermally managed battery assembly 10 as a thermocrystal metamaterial structure, it is also contemplated that one or more other components of the thermally managed battery assembly 10, such as the anode 14, may be constructed as a thermocrystal metamaterial structure to enhance thermal management. Modifying a battery assembly such that the anode, rather than the cathode, is a thermocrystal metamaterial structure, or such that both the anode and the cathode are thermocrystal metamaterial structures, will not result in a departure from the scope of the present disclosure.

Figure 3:
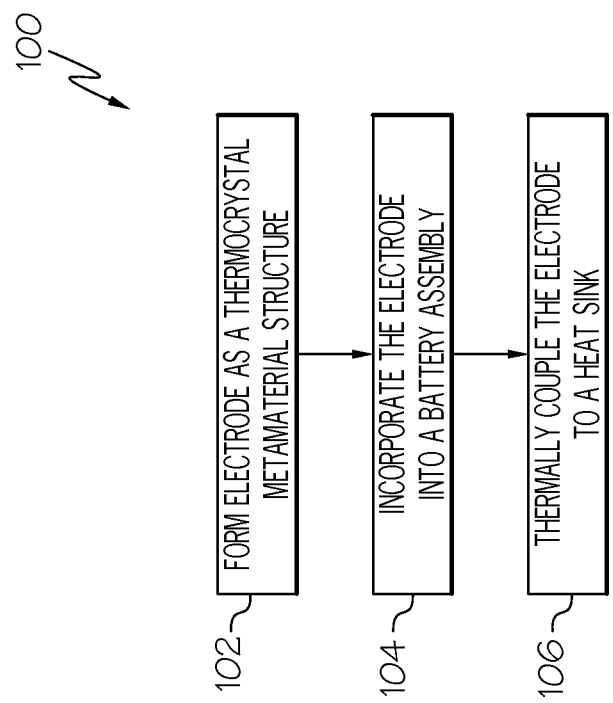
FIG. 3 is flow chart depicting one embodiment of the disclosed method for thermally managing a battery.

Referring to FIG. 3, also disclosed is a method, generally designated 100, for thermally managing a battery assembly. The method 100 may begin at Block 102 with the step of forming an electrode as a thermocrystal metamaterial structure. The thermocrystal metamaterial structure of the electrode may be formed by introducing impurities into a crystal lattice, such as lithium cobalt oxide.

At Block 104, the electrode formed in Block 102 may be incorporated into a battery assembly. For example, the electrode having a thermocrystal metamaterial structure may be used as the cathode of the battery assembly. Therefore, the battery assembly, which may be a lithium-ion battery, may include an electrolyte, an anode immersed in the electrolyte, the thermocrystal metamaterial structure electrode (cathode) immersed in the electrolyte, and a separator separating the anode from the cathode.

At Block 106, a heat sink may be thermally coupled to the thermocrystal metamaterial structure electrode. Therefore, the thermocrystal metamaterial structure electrode may focus heat onto the heat sink, and the heat sink may extract the heat from the battery assembly.

Accordingly, the disclosed thermally managed battery assembly and associated method may employ a thermocrystal metamaterial structure to focus heat onto a single target area (or a few specific target areas) such that excess heat need only be extracted at a single point (or a few specific points). As such, the disclosed thermally managed battery assembly may be more lightweight and compact, while also being less prone to thermal runaway.

Although various embodiments of the disclosed thermally managed battery assembly and method have been shown and described, modifications may occur to those skilled in the art upon reading the specification. The present application includes such modifications and is limited only by the scope of the claims.

What is claimed is:

1. A battery assembly comprising:
   an anode and a cathode, wherein at least one of said anode and said cathode comprises a thermocrystal metamaterial structure, said thermocrystal metamaterial structure comprising:
      a metal oxide crystal lattice;
      metal ions embedded between layers of said metal oxide crystal lattice; and
      at least one of interstitial defects and replacement elements introduced within said metal oxide crystal lattice configured to directionally align lattice vibrations and focus heat waves generated from said lattice vibrations.

2. The battery assembly of claim 1 further comprising an electrolyte, wherein said anode and said cathode are electrically coupled with said electrolyte.

3. The battery assembly of claim 2 wherein said electrolyte is a non-aqueous electrolyte.

4. The battery assembly of claim 1 further comprising a separator positioned to electrically isolate said anode from said cathode.

5. The battery assembly of claim 1 further comprising a battery housing, wherein said anode and said cathode are housed in said battery housing.

6. The battery assembly of claim 1 wherein said anode comprises a conductive carbonaceous material.

7. The battery assembly of claim 1 wherein said interstitial defects introduced within said metal oxide crystal lattice comprise nanoparticles.

8. The battery assembly of claim 1 wherein said replacement elements introduced within said metal oxide crystal lattice comprise at least one of iron and nickel.

9. The battery assembly of claim 1 further comprising a heat sink thermally coupled to said thermocrystal metamaterial structure at a target area defined by focused heat waves.

10. A battery assembly comprising:
    an anode; and
    a cathode, wherein said cathode comprises a thermocrystal metamaterial structure, said thermocrystal metamaterial structure comprising:
       a cobalt oxide crystal lattice;
       lithium ions embedded between layers of said cobalt oxide crystal lattice; and
       at least one of interstitial defects and replacement elements introduced within said cobalt oxide crystal lattice configured to directionally align lattice vibrations and focus heat waves generated from said lattice vibrations.

11. The battery assembly of claim 10 further comprising an electrolyte, wherein said anode and said cathode are electrically coupled with said electrolyte.

12. The battery assembly of claim 10 further comprising a separator positioned to electrically isolate said anode from said cathode.

13. The battery assembly of claim 10 further comprising a battery housing, wherein said anode and said cathode are housed in said battery housing.

14. The battery assembly of claim 10 wherein said anode comprises a conductive carbonaceous material.

15. The battery assembly of claim 10 wherein said interstitial defects introduced within said cobalt oxide crystal lattice comprise iron nanoparticles.

16. The battery assembly of claim 10 wherein said replacement elements introduced within said cobalt oxide crystal lattice comprise nickel to replace some cobalt of said cobalt oxide crystal lattice.

17. The battery assembly of claim 10 wherein said replacement elements introduced within said cobalt oxide crystal lattice comprise iron to replace some cobalt of said cobalt oxide crystal lattice.

18. The battery assembly of claim 10 further comprising a heat sink thermally coupled to said thermocrystal metamaterial structure at a target area defined by focused heat waves.

19. A thermal management method comprising the steps of:
    forming an electrode having a thermocrystal metamaterial structure, said thermocrystal metamaterial structure comprising:
       a metal oxide crystal lattice;
       metal ions embedded between layers of said metal oxide crystal lattice; and
       at least one of interstitial defects and replacement elements introduced within said metal oxide crystal lattice configured to directionally align lattice vibrations and focus heat waves generated from said lattice vibrations;
    incorporating said electrode into a battery assembly; and
    thermally coupling a heat sink to said electrode such that said thermocrystal metamaterial structure directionally aligns said heat waves with said heat sink.

* * * * *